United States Patent
Jovanovic

[15] 3,650,201
[45] Mar. 21, 1972

[54] TEA AND COFFEE BREWER

[72] Inventor: Dragomir M. Jovanovic, 17, Rue St. Michel, Lyon 7, France

[22] Filed: Sept. 3, 1969

[21] Appl. No.: 854,829

[52] U.S. Cl. ............................................................99/279
[51] Int. Cl. ......................................................A47j 31/00
[58] Field of Search....................99/279, 280, 281, 282, 283, 99/300, 302, 304, 306, 305, 316

[56] References Cited

UNITED STATES PATENTS

| | | | |
|---|---|---|---|
| 1,185,073 | 5/1916 | Ehrheart | 99/300 |
| 2,024,859 | 12/1935 | Hillseth | 99/306 |
| 2,437,601 | 3/1948 | Hamlet | 99/307 |
| 3,220,334 | 11/1965 | Martin | 99/304 |

*Primary Examiner*—Robert W. Jenkins
*Attorney*—Le Blanc and Shur

[57] ABSTRACT

Disclosed is a brewer for brewing and dispensing coffee, tea, soup or the like. A brewing chamber is surrounded by a reservoir of hot water with the reservoir in fluid communication with a standpipe extending downwardly into the brewing chamber. A metered charge of cold water supplied to the reservoir drives a like amount of hot water from the reservoir into the standpipe where it is mixed with particles of coffee, tea or the like. The pressure head in the standpipe forces beverage mixed with particles out of the brewing chamber and this outflow of beverage is sustained and subsequently cutoff by a siphon effect to deliver a metered amount of beverage.

14 Claims, 6 Drawing Figures

TEA AND COFFEE BREWER

This invention relates to a device for brewing hot liquids such as tea and coffee and while the invention will be described primarily in conjunction with coffee brewing, it is understood that it is equally applicable to brewing tea or for brewing and dispensing other hot liquids such as soup made from powders containing particles of meat and/or vegetables.

Coffee brewers are well known and take a variety of forms. Commercial units as distinguished from brewers designed for home use are in general quite complex so that they entail a substantial initial expense and are not economical to operate and maintain in an optimum clean condition. A serious disadvantage is that many units incorporate a pressure chamber in which water is boiled to create steam so that the units present an explosion hazard from excessive pressures in the event of a malfunction.

The present invention provides a coffee or tea brewer which overcomes these and other disadvantages by providing a simplified and inexpensive brewing device which is not only economical in construction but one which may be operated and periodically cleaned with a minimum of time and expense. Important features of the present invention include the incorporation of a brewing chamber which operates at or near atmospheric pressures so as to minimize hazards from explosion in the event of a malfunction. In addition, the brewer of the present invention operates on a siphon principal to insure adequate mixing of the coffee grounds or tea leaves with the hot water to provide a tasty beverage and permits rapid dispensing of an accurately metered amount of beverage.

In the brewer of this invention a glass brewing container substantially filled with water is immersed in a surrounding heated storage reservoir of hot water with which it is in fluid communication. The water in the reservoir and consequently in the brewing container which it surrounds is heated to an accurate operating temperature by a thermostat controlled immersion-type electrical resistance heater.

An accurately metered amount of cold water is injected into the reservoir from a conventional water main outlet and the pressure of the water from the main causes a portion of the heated water in the reservoir to be driven upwardly into a standpipe communicating with the brewing container and finally into a mixing bowl adapted to receive a metered amount of dry coffee grounds or tea leaves from a suitable dispenser. When the liquid in the mixing bowl reaches a predetermined level brewed beverage is driven by the weight of this column of liquid outwardly from the brewing container through a dispensing outlet where it may pass through a suitable extraction unit and final mixing device to form a cup of coffee or tea.

Flow of beverage through the dispensing outlet once it has been initiated is maintained through a siphon effect until such time that all liquid is withdrawn from the mixing bowl and the water level in the brewing container has reached its initial level. Because of a unique air and vapor lock formed above the water level in the brewing container the siphon pressures become equalized when the liquid level reaches its initial position and the outward dispensing flow of beverage is rapidly cut off in an accurate and dropless manner. Because of the construction of the brewing container and mixing bowl in conjunction with the liquid inlet supply, tea leaves or coffee grounds are agitated and thoroughly mixed with the hot water in the container to provide a fully brewed and tasty cup of tea or coffee. A certain amount of the coffee grounds or tea leaves are removed from the brewing chamber with each cup dispensed so that the particles in the chamber are constantly being renewed by fresh charges of coffee grounds or tea leaves.

It is, therefore, one object of the present invention to provide an improved tea or coffee brewer.

Another object of the present invention is to provide an improved device for brewing and accurately dispensing predetermined amounts of a hot beverage such as coffee, tea, or the like.

Another object of the present invention is to provide an improved method of brewing and/or dispensing accurate amounts of hot liquids such as coffee, tea, soup, or the like.

Another object of the present invention is to provide a tea or coffee brewer in which the tea or coffee is brewed at substantially atmospheric pressures, so that explosion hazards due to overpressure caused by boiling water and steam are minimized.

Another object of the present invention is to provide a brewing device of simplified and inexpensive construction which is economical to manufacture and one which may be operated and cleaned with a minimum of cost and effort.

Another object of the present invention is to provide a brewing device in which a beverage is dispensed through a siphon connection so that accurate amounts of beverage are rapidly discharged and the discharge flow is cutoff in a positive and dropless manner.

Another object of the present invention is to provide a tea or coffee brewer in which the coffee grounds or tea leaves are thoroughly mixed with heated water and constantly renewed by fresh charges of coffee or tea so as to produce a completely brewed and tasty cup of the brewed beverage.

Another object of the present invention is to provide a hot beverage brewer which may be constructed in a wide range of sizes suitable for use as either a relatively small capacity home brewer or a large capacity commercial unit.

These and further objects and advantages of the invention will be more apparent upon reference to the following specification, claims and appended drawings wherein:

Figure 1:
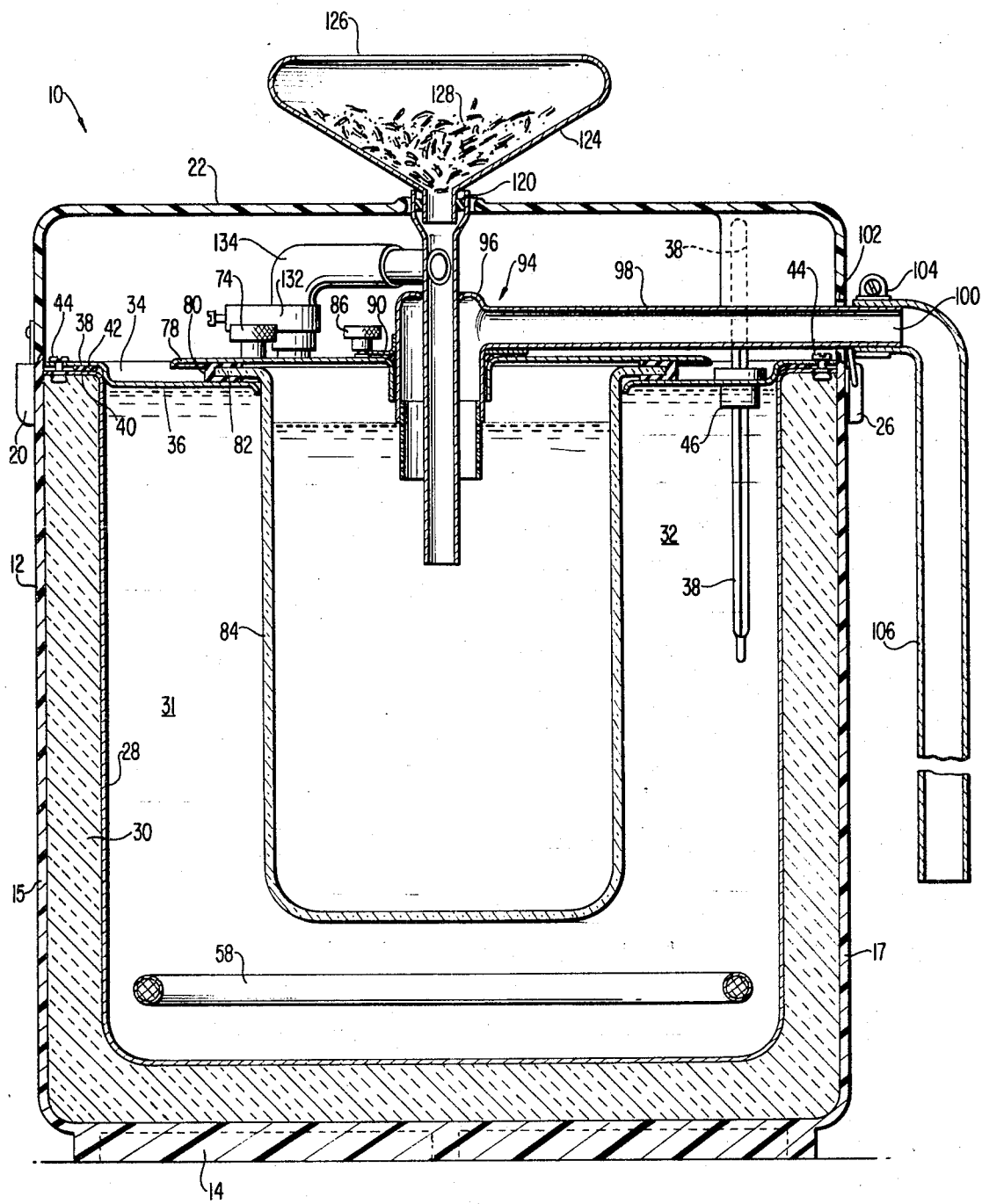
FIG. 1 is a vertical cross section of a coffee brewing and dispensing device constructed in accordance with the present invention which cross section is taken along line 1—1 of FIG. 2.
Figure 2:
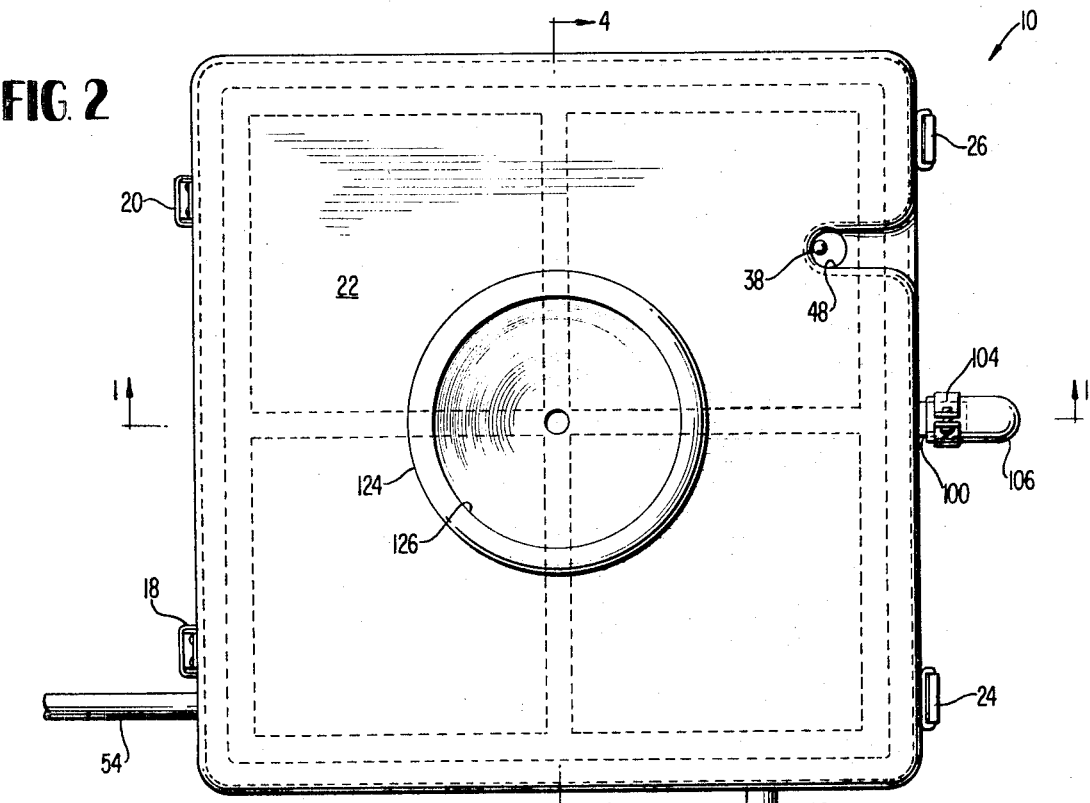
FIG. 2 is a top-plan view of the coffee brewer of FIG. 1.

Referring to the drawings, the novel brewer of the present invention is generally indicated at 10 in FIG. 1. The brewer comprises a plastic container 12 including a thickened base 14 forming a stand for the device and upwardly extending integral sidewalls 11, 13, 15 and 17. The brewer as shown is of generally rectangular, i.e., square, cross section with smoothly rounded corners. Mounted by suitable hinges along the upper edge of wall 15 as by the hinges 18 and 20 in FIG. 2 is a plastic cover 22. The cover 22 is adapted to be fastened to the opposite sidewall 17 of container 12 by a pair of locks 24 and 26 as best seen in FIG. 2.

Within container 12 is a hot water reservoir or chamber 31 comprising an inner stainless steel liner 28 spaced from container 12 by a relatively thick layer of suitable heat insulating material indicated at 30. The reservoir is completely filled with water as indicated at 32 and is closed off at its upper end by a stainless steel annular lid 34 having a lower or depressed inner portion 36 and a raised outer edge or flange 38 spaced from a corresponding turned over edge or flange 40 of liner 28 by an annular sealing ring 42. Sealing ring 42 provides a tight seal between the flanges due to the clamping action of a plurality of circumferentially spaced bolts 44 joining the flanges 38 and 40. Passing through a suitable aperture in lid 34 is a hollow sealing gasket or plug 46 which supports in sealing engagement, a thermometer 38 extending downwardly through the lid so that its lower end projects into the hot water 32 as illustrated in FIG. 1. Cover 22 is cut back or recessed as at 48 in FIG. 2 so that the upper end of the thermometer 38 is visible for reading even when the cover 22 is closed.

Figure 5:
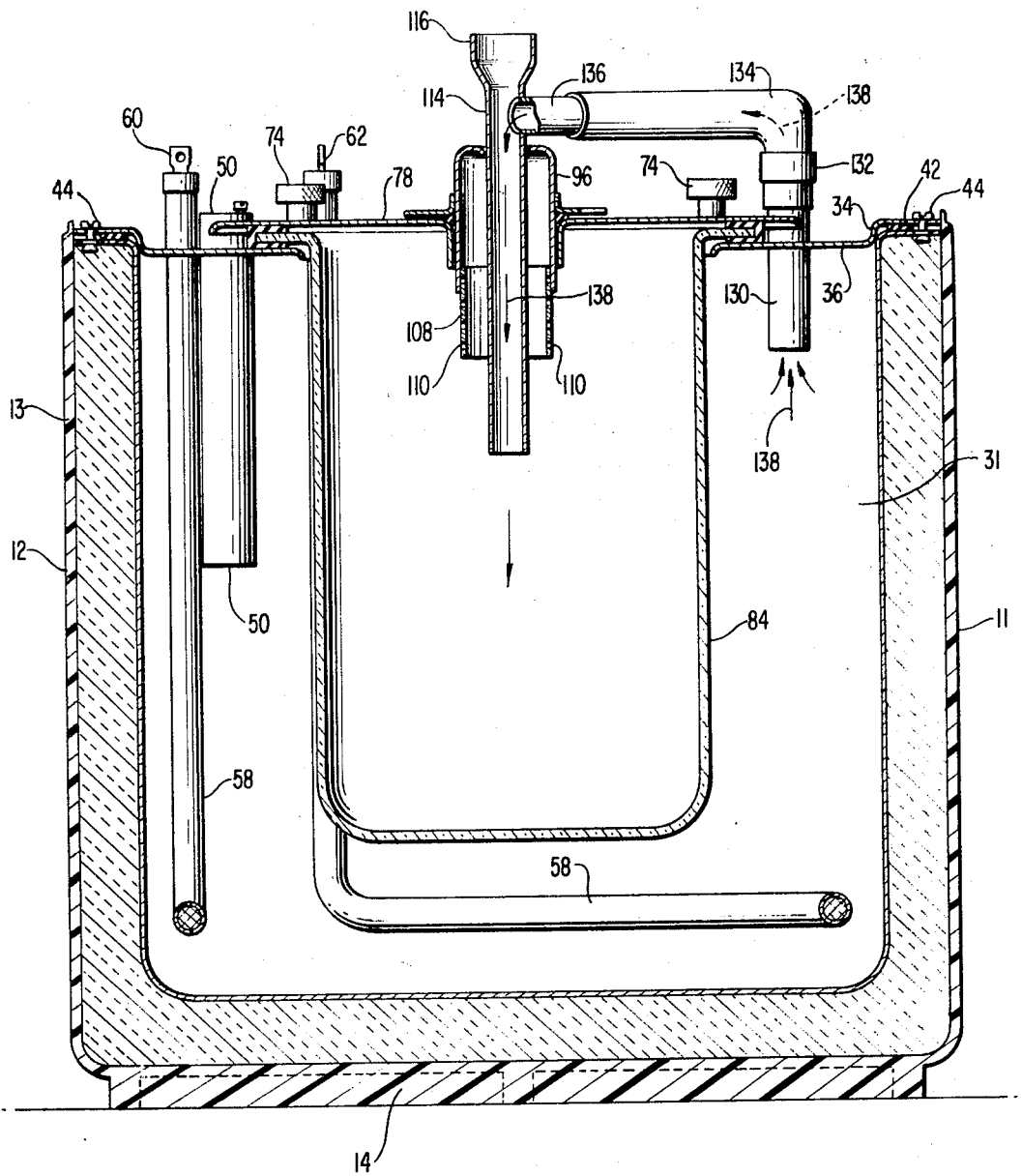
FIG. 5 is a vertical section through the brewer with the cover removed taken along line 5—5 of FIG. 3, i.e., a view along the same line but in the opposite direction to that of FIG. 4.

Also mounted on lid 34 and passing through it and extending downwardly into the water 32 in reservoir 31 is a precision thermostat 50 best seen in FIG. 5. Thermostat 50 is connected to one of the leads 52 in FIG. 3 of an electrical power supply cable 54. The other lead 56 of the power supply cable is electrically connected to one end of a resistance heater 58 by way of a heater terminal 60. The resistance heater passes downwardly through lid 34 on which it is mounted to adjacent the bottom of reservoir 31 where it passes circumferentially around the bottom of the reservoir immersed in the water as indicated by the dashed lines in FIG. 3 until it again extends upwardly and passes through lid 34 to end in electrical terminal 62. This terminal is connected by a short lead 64 to the other side of the thermostat so that the other end of the resistance is returned through the thermostat to the other side of the power supply cable. Thermostat 50 senses the temperature of the water in reservoir 31 and opens and closes in accordance with the water temperature, to control the current flowing through resistance heater 58 to maintain the water temperature to within plus or minus 1° C. of the desired temperature.

Figure 4:
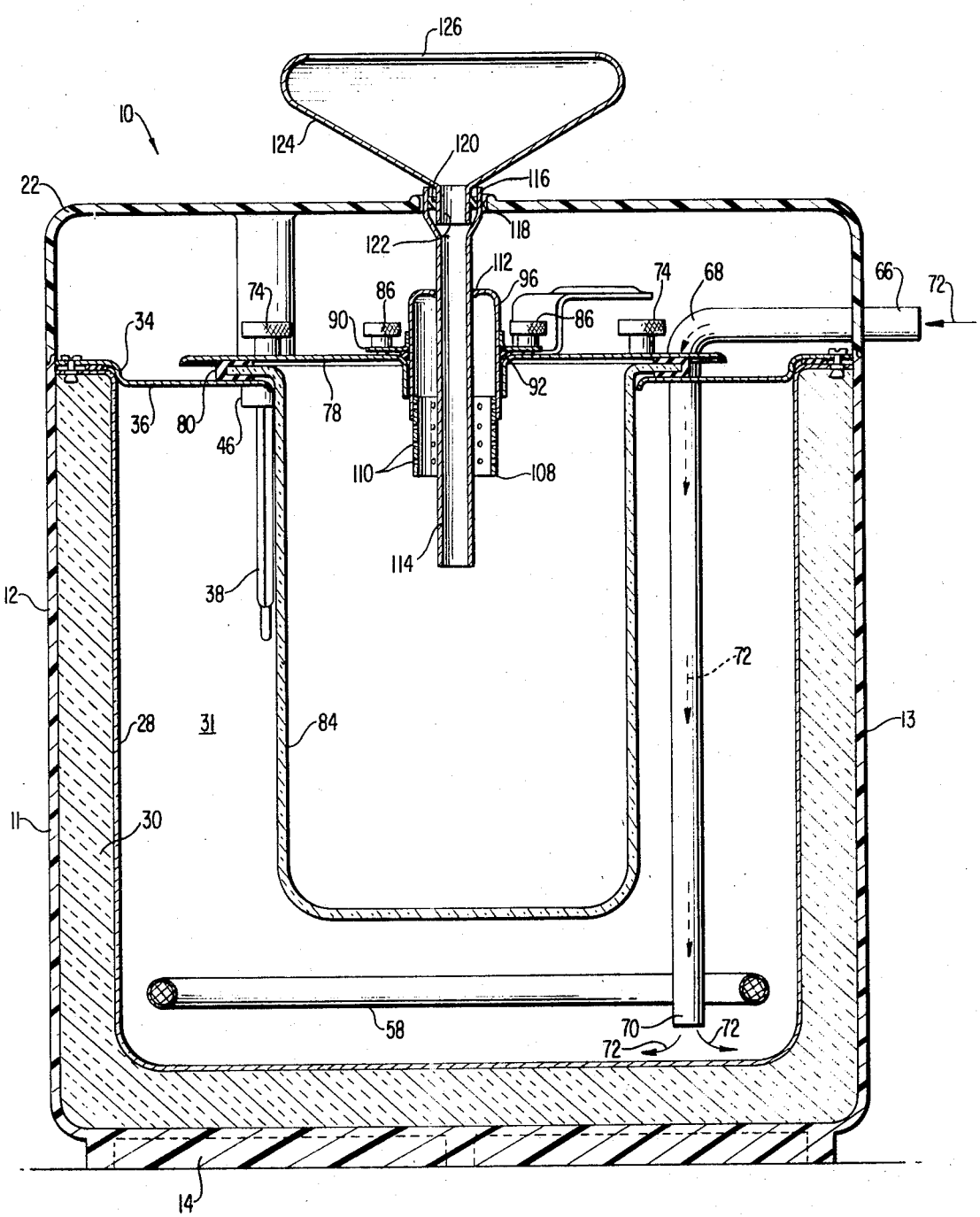
FIG. 4 is a cross section through the brewer similar to the view of FIG. 1 but taken at right angles to FIG. 1 along line 4—4 of FIG. 2.

Cold water is supplied to the reservoir through inlet pipe 66 (FIG. 4) which pipe is curved as at 68 and passes downwardly through lid 34 in which it is supported to discharge at its lower end 70 as illustrated in FIG. 4 adjacent the bottom of chamber 31. Cover 22 is preferably suitably cut away along this edge to permit inlet tube 66 to pass through it. The flow of cold water and discharge into the bottom of the reservoir or chamber 31 is indicated by the arrows 72 in FIG. 4.

Also mounted in lid 34 are four quick fastening bolts 74 (FIG. 3) which cooperate with corresponding cutouts 76 of an annular stainless steel cap 78 to tightly clamp the cap to lid 36. Clamped between the cap and lid is an annular seal 80 having a central inner annular groove receiving the outer edge of flange 82 extending from the top edge of a glass brewing container 84. Glass brewing container 84 extends downwardly so that its bottom is spaced above the bottom of chamber 31 and slightly above the lower turn of heater 58 so that the liquid or beverage within the brewer container 84 is also heated by the resistor as well as by the surrounding water in reservoir 31.

Figure 3:
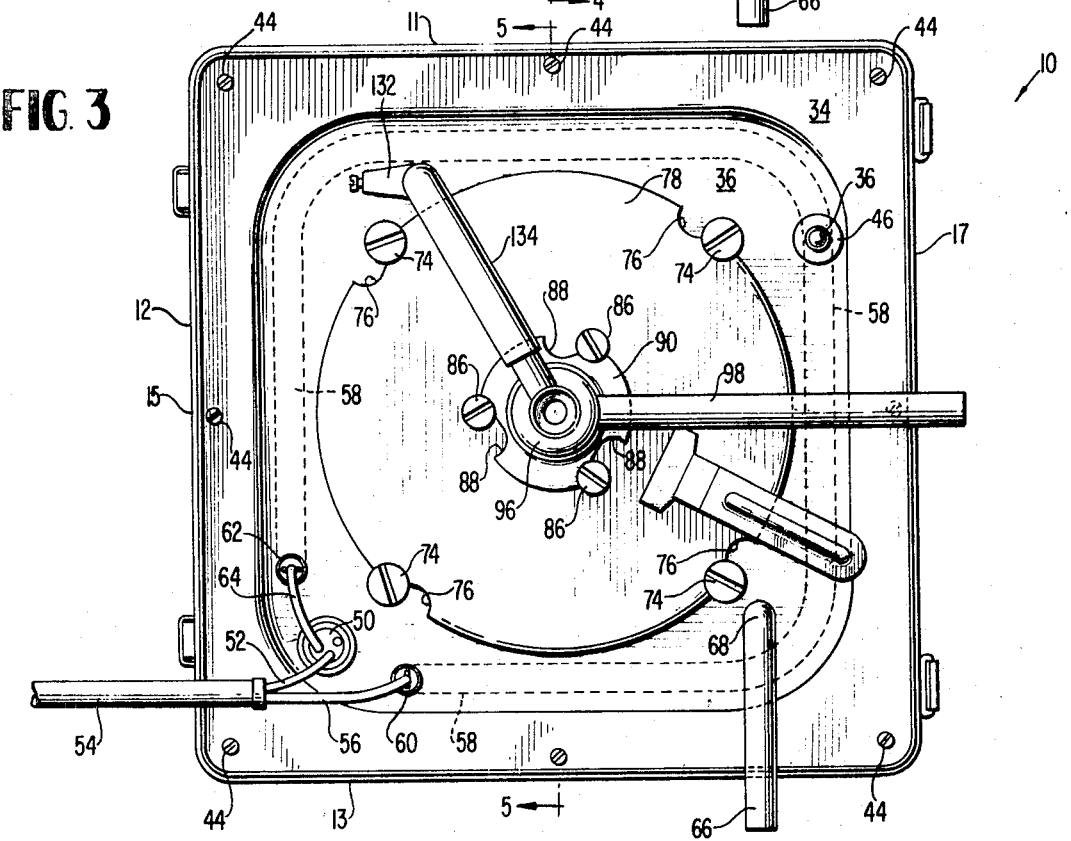
FIG. 3 is a top-plan view of the coffee brewer similar to the view of FIG. 2 but with the brewer cover and mixing bowl removed to show some of the interior structure of the device.

Received in cap 78 are a second set of quick fastening bolts, this time three in number, as indicated at 86 in FIG. 3 which cooperate with corresponding cutouts 88 in the edge of a holder 90 to releasably clamp the holder to cap 78. Squeezed between the holder and cap is the annular sealing gasket 92. This gasket also effects a seal between the cap 70 and a dispenser outlet 94 comprising a vertical pipe or tube 96 preferably of stainless steel formed integral with a horizontal discharge tube 98 through which the beverage is discharged. The other end 100 of discharge tube 98 passes through a suitable cutout 102 in cover 22 and is secured by a strap and bracket 104 to one end of a beverage delivery tube 106. Received with a friction fit in the lower end of vertical outlet tube 96 is a perforated tube or strainer 108 having apertures 110 communicating with the interior of brewer container 84.

The upper end of outlet tube 96 is turned over to define an aperture 112 through which passes a vertical standpipe 114 which extends downwardly with its lower end immersed in the liquid or beverage within brewer container 84. The upper enlarged end 116 of the standpipe 114 passes through an aperture 118 in cover 22 and receives a sealing ring 120 surrounding the lower tubular end 122 of a conical mixing bowl 124. The top of the mixing bowl 124 is open to atmosphere as at 126 and through this opening the mixing bowl is adapted to be fed with a charge of dry tea or coffee from a suitable dispenser (not shown) which dry grounds are illustrated at 128 in FIG. 1.

Extending downwardly through lid 34 into reservoir 31 is a feed tube 130 as best seen in FIG. 5 which is secured by a strap and bracket 132 to the vertical leg of a feed elbow 134. At its other end the horizontal leg of the elbow receives with a friction fit a hot water inlet tube 136 in fluid communication with the upper end of standpipe 114 just below its enlarged section 122. The flow of hot water from the reservoir 31 into standpipe 114 and through the standpipe into the interior of brewer container 84 is indicated by the arrows 138 in FIG. 5.

Figure 6:
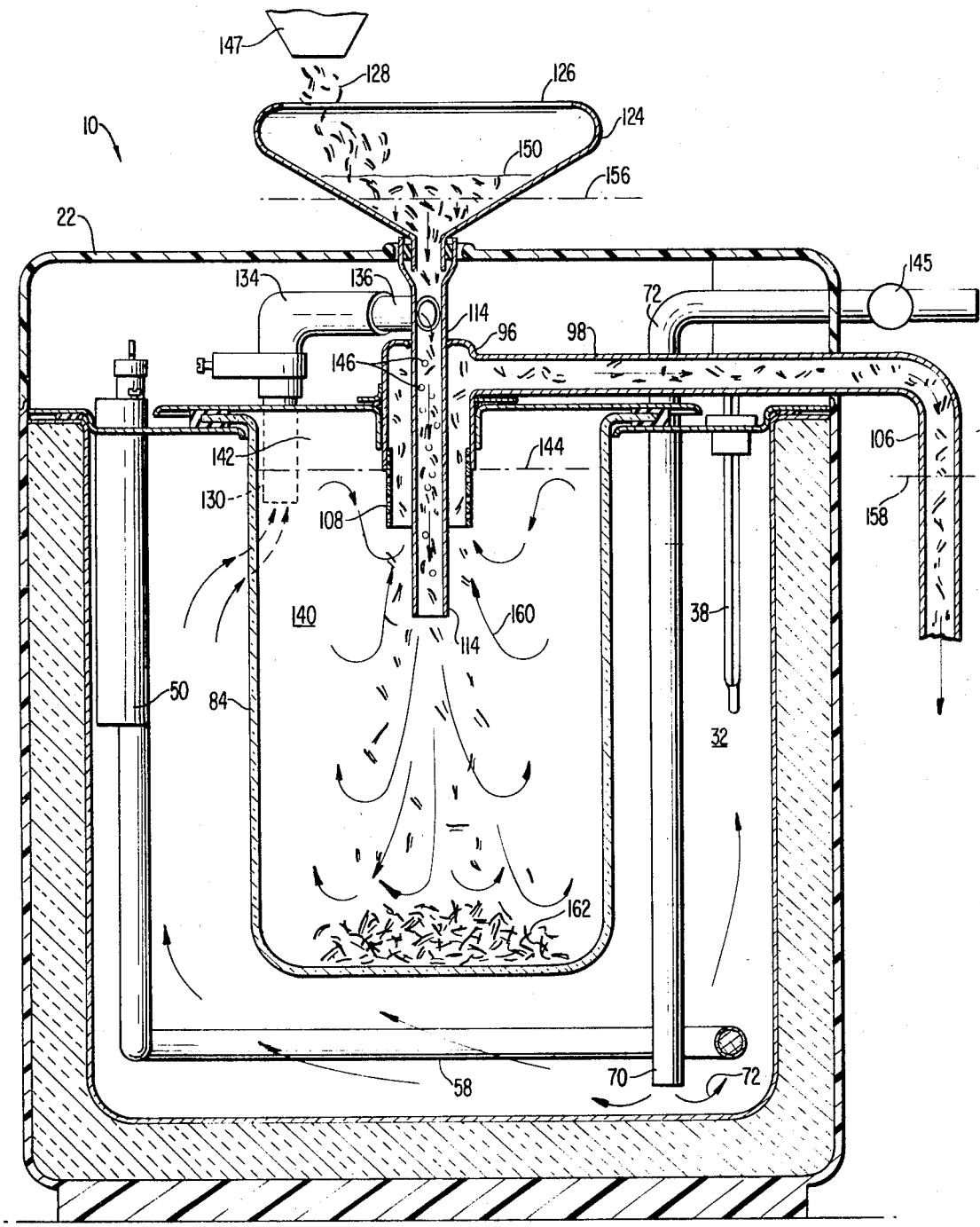
FIG. 6 is a composite cross section similar to that of FIG. 1 but showing all the major components of the device for the purposes of explaining its operation.

FIG. 6 is a composite cross section through the brewer 10 similar to that of FIG. 1 but showing all the essential elements of the device for the purposes of explaining its operation. In FIG. 6, corresponding parts bear the same reference numerals. As can be seen in FIG. 6, the reservoir 31 is completely filled with water which is heated by resistance heater 58 to the desired temperature under the control of the precision thermostat 50. The temperature in reservoir 31 is indicated by and may be visibly read from the thermometer 38 projecting into the reservoir. The brewer container 84 is similarly shown substantially completely filled with water 140, i.e., it is filled except for the air and vapor lock space indicated at 142 adjacent its upper end defining a normal or initial liquid level in the brewer container 84 which liquid level is indicated at 144.

In operation, a timed electromagnetic valve 145 working under a predetermined water pressure such as supplied from a conventional water main delivers one precise quantity of cold water from the main through inlet tube 72 in FIG. 6 where it discharges from the lower end 70 of the tube into the reservoir 31. Because of this discharge from the water main under the elevated pressure from the main an identical quantity of water is forced upwardly through feed pipe 130 into the standpipe 114. The vertical standpipe is open to atmospheric pressure at its top by the aperture 126 in mixing bowl 124 and the standpipe is immersed in the brewing beverage 140 at its lower end. Because of the vapor and airlock formed in the space 142 the level of liquid 140 remains substantially constant at 144 within the brewing container 84. When the hot water starts flowing into the vertical standpipe 114 it impulses air upwardly and further air escapes by way of the air bubbles as indicated at 146 in FIG. 6 flowing upwardly through the standpipe to discharge through the top of the mixing bowl to atmosphere through opening 126.

The hot water starts filling up the standpipe 114 and fills up this standpipe and part of the mixing bowl 124 to the approximate level indicated at 150 in FIG. 6. While the hot water level is still rising in the mixing bowl 124 supported by the air and vapor lock pressure at 142 a precise quantity of tea leaves or fresh coffee grounds is dispensed over the hot water surface 150 from dispenser 147, i.e., while the water is still rising but approaching its critical level. The approximate critical level is indicated at 156 in FIG. 6.

The water rises in the standpipe 114 and into the bottom of the mixing bowl and the weight of this water is resisted by the vapor and airlock at 142. However, the weight of the water in the standpipe and mixing bowl pushes water near the center of brewer container 84 upwardly into outlet tube 96 and when the level of the water in the mixing bowl is approximately at the critical height 156 the weight of this water is sufficient to drive beverage through outlet tube 96 and by way of discharge tube 98 through delivery tube 106. A fast full flow starts abruptly when the critical height is reached, and is maintained by the siphon action of the outwardly flowing beverage as soon as the column of beverage in the dispensing column of the delivery tube reaches a critical level indicated approximately at 158 in FIG. 6.

Rapid outflow of beverage continues due to the siphon action of the column of beverage in delivery tube 106 and during this time the hot water from the mixing bowl 124 containing tea leaves or coffee grounds rushes down the vertical standpipe 114 into the glass brewing container 84 thus dispersing the tea leaves or coffee grounds throughout the interior of the brewing container 84 and effecting a mixing action by lifting up and mixing the deposit of leaves or grounds from the previous actions. This mixing action is illustrated by the arrows at 160 in FIG. 6 with the heavy leaves or grounds deposited by previous dispensing steps collected at the bottom of brewing container 84 as indicated at 162. The water supply preferably terminates its flow at the very moment of full through flow action of the liquid down standpipe 114, thus leaving a very clean pipe behind ready for the next operation.

The strongly siphoned beverage containing tea leaves or coffee grounds flows fast through the dispensing tube 98 and delivery tube 106 to an automatic extraction unit and final mixing device (not shown). The outflow of the beverage is cutoff very abruptly and in a dropless manner when the liquid level in standpipe 114 reaches its previous height approximately indicated at 144. This cutoff is again effected by a siphon action and occurs when the inside pressures equalize with the atmospheric pressure acting on the output end of delivery tube 106. The delivered quantity of beverage is substantially identical in amount to the cold water initially supplied through valve 145.

The outwardly flowing beverage takes from the brewing chamber 84 a certain quantity of tea leaves or coffee grounds with each cup of beverage delivered. This quantity is quite precise over a number of operations and there always remains within the brewing container a substantially constant quantity of tea leaves or coffee grounds. In the preferred embodiment the size of the brewing chamber 84 is chosen so as to contain in the neighborhood of five to 10 cups of liquid with each cup consisting of 180 cubic centimeters of liquid. This is for a brewer having overall dimensions as shown in the drawings which are approximately to scale of about 28.5 centimeters on each side and an overall depth from cover to base (excluding the mixing bowl) of about 33 centimeters. The operating temperature of the liquid both in container 84 and in reservoir 31 is preferably maintained at 97° C. plus or minus 1° C., when the brewer is used to brew coffee and is preferably maintained at a temperature 2° less, i.e., at 95° C. plus or minus 1° C. when the brewer is used to brew tea. These temperatures are preferred but it is apparent that brewing may occur at any desired temperature.

An important feature of the invention is that the brewing temperature is less than 100° C. so that excessive pressures and the accompanying danger of explosion are not present in the brewing device of this invention. In the preferred embodiment the whole unit is kept at a brewing temperature resulting in an optimal ratio of approximately 90 to 1 which means that one water charge bringing into the brewer 180 cubic centimeters of cold water brings this cold water into contact with a 90-times larger mass of metal and hot liquid so that the incoming water is immediately heated up in the reservoir 31 to the desired temperature and the slight loss of heat in the reservoir in the area of thermostat 50 (approximately 1° C.) is sufficient to start the resistance heating. In the preferred construction there is an overheating cutout safety device on the resistance and the entire unit is very safe so no pressure can build up and any failure of the thermostat results in only moderate steaming and complete cutout and stoppage of the unit.

During the charge of hot liquid into the brewing container 84, the air and vapor lock space is only slightly compressed with the with the weight of the incoming liquid acting to drive beverage through the outlet tube to initiate the siphon action. Cutoff is reached when the pressures equalize, i.e., when the atmospheric pressure at the outlet of delivery tube 106 minus the pressure of the column of liquid in this tube equals the interior pressure in the brewer chamber 84. This equalization occurs when the water in the standpipe 114 falls below its initial level such that a further drop in fluid level within the standpipe would tend to create a partial vacuum in the vapor lock space 142. Thus, since there is only a very slight variation in the liquid level 144 within the brewing container due to the air vapor lock by suitably dimensioning the standpipe and outlet tube the water level at cutoff returns in these tubes to its initial level such that an exact quantity, i.e., 180 cubic centimeters of beverage is dispensed each time. Preferably cap 78 is provided with a small adjustable nozzle (not shown) for bleeding to atmosphere any excess air which may collect in space 142 and to produce a smoother siphon action. Each repeated action causes the same above-described results and the take out of a very even proportion of tea leaves or coffee grounds (plus or minus 3 percent maximum between two actions but a very good result over 100 actions with no accumulation or early discharge tendency of particles). The minimum quantity of liquid able to start the siphon action is approximately 75 cc.'s. By increasing the flow-in, the flow-out is increased, and the optimum value is 180 cc.'s. It is also possible to obtain a full flow action at near the rate of approximately 1 gallon of beverage every 3 minutes with a constant flow-out in the above-described unit. It is, of course, possible to increase the quantity of discharge in larger devices.

The start level of fluid flow is determined simply by the height and weight of the water column in the standpipe 114 and the mixing bowl 124. In the embodiment described, the critical level 156 is approximately 4 inches above the initial level 144 of the liquid in brewing container 84.

It is apparent from the above that the present invention provides an improved and simplified device for brewing coffee or tea, or for brewing other hot liquids such as soup or the like. Important features of the present invention include operation of the brewer at temperatures below 100° C. and the provision of a siphon-type dispensing action which provides rapid flow, quick drop-free cutoff and the repeated dispensing of accurate quantities of beverage. The brewer is located inside the heating reservoir to permit precision heat control enabling excellent brewing and stopping deterioration of the beverage over many hours. The pressure-free operation eliminates danger and the necessity for excessive and complicated pressure control components. The simplified and readily disassembled construction provides for economic, trouble-free design and operation with easy access to all parts for cleaning and service. The brewer and boiler are combined so as to result in a substantial saving in space and production costs, and substantially minimizing the size of the unit for brewing a given amount of beverage. The beverage is delivered at an optimum high temperature susceptible to being cooled down by the admixture of cream, sugar or other sweeteners or components. Finally the automatic tea leaves or coffee grounds elimination in substantially equal quantities owing to the mixing and suction effect of the process provides for economic tea or coffee making resulting in a very satisfactory and tasty product.

What is claimed and desired to be secured by United States Letters Patent is:

1. A brewer comprising a central brewing chamber adapted to receive solid particles in admixture with a brewing liquid, a liquid reservoir surrounding said central brewing chamber, heating means in said reservoir, an inlet coupled to said reservoir for supplying fresh liquid to said reservoir, means coupling said reservoir and said brewing chamber for passing from said reservoir to said brewing chamber a like amount of heated liquid, and outlet means coupled to said brewing chamber for discharging a mixture of particles and liquid from said brewing chamber in response to passage of liquid from said reservoir into said brewing chamber, said outlet means including a siphon for discharging said mixture in regulated quantities.

2. Apparatus according to claim 1 wherein said heating means includes a temperature control for maintaining the temperature of the liquid in said brewing chamber and surrounding reservoir at a predetermined level below 100° centigrade.

3. Apparatus according to claim 2 wherein said heating means comprises an electrical resistance heater in said reservoir and said control means comprises a thermostat electrically coupled to said heater.

4. Apparatus according to claim 1 wherein said brewing chamber is provided with an opening to atmospheric pressure, said opening providing access for solid particles into said brewing chamber.

5. A brewer comprising a central brewing chamber, a standpipe communicating with the interior of said chamber and extending outwardly of said chamber, a liquid reservoir surrounding said central brewing chamber, heating means in said reservoir for heating liquid in said reservoir and brewing chamber, an inlet coupled to said reservoir for supplying charges of fresh liquid to said reservoir, a conduit coupled between said reservoir and a portion of said standpipe exterior of said brewing chamber whereby the addition of fresh liquid to said reservoir forces a like amount of heated liquid from said reservoir into said standpipe, said standpipe having an open end for the addition of solid particles, and outlet means coupled to said brewing chamber for discharging a mixture of particles and liquid from said brewing chamber in response to the passage of liquid from said reservoir into said standpipe.

6. Apparatus according to claim 5 wherein said standpipe terminates in a mixing bowl for receiving solid particles and liquid.

7. Apparatus according to claim 5 wherein said outlet means includes a tubular section surrounding but spaced from a portion of said standpipe extending from the inside to the outside of said brewing chamber, the portion of said tubular outlet section inside said chamber defining an air and vapor lock space in conjunction with adjacent walls of said chamber.

8. Apparatus according to claim 7 wherein said outlet means includes a siphon tube communicating with said tubular section outside said brewing chamber for discharging a mixture of said particles and liquid from said brewing chamber.

9. Apparatus according to claim 5 wherein said reservoir comprises a heat insulating container, said brewing container depending from the interior top wall of said reservoir and being spaced from the bottom and sidewalls of said reservoir.

10. Apparatus according to claim 9 wherein said reservoir includes an inner surface of stainless steel, said brewing container being made of glass.

11. A brewer comprising an outer container including a layer of heat insulating material, said outer container including a removable lid, an inner brewing container supported by the lid of said outer container, said inner brewing container having a removable cap, said brewing container being spaced from the bottom and side walls of said outer container, heating means in the space between said outer container and said brewing container, a standpipe removably mounted on said brewing container cap and passing through said cap to the interior of said brewing container, a pipe coupling the space between said containers to the interior of said standpipe externally of said brewing container, said standpipe terminating exteriorly of said brewing container in an open end through which solid particles may be inserted into said standpipe and brewing container, a tubular discharge section mounted on said cover and surrounding in spaced relation a portion of said standpipe passing interiorly and exteriorly of said brewing chamber through said cover, the portion of said section interior or of said brewing chamber forming an air and vapor lock space within said brewing chamber in conjunction with said cap and the adjacent wall portions of said brewing container, a siphon tube communicating with said tubular discharge section exteriorly of said brewing chamber for discharging a mixture of solid particles and liquid from said brewing container, and an input pipe coupled to the space between said containers for supplying fresh liquid to said brewer.

12. Apparatus according to claim 11 including a conically shaped mixing bowl secured to the top of said standpipe for receiving solid particles and mixing them with liquid in said bowl.

13. Apparatus according to claim 11 including a cover secured to said outer container, said inlet pipe, said siphon tube and said standpipe passing through said outer container cover.

14. Apparatus according to claim 13 including a thermometer projecting into the space between said container and extending through a setback in said outer container cover so that it may be read from outside said brewer.

* * * * *